United States Patent [11] 3,573,375

[72] Inventor Dan J. Kinzer
Orem, Utah
[21] Appl. No. 775,321
[22] Filed Nov. 13, 1968
[45] Patented Apr. 6, 1971

[54] COMMUNICATIONS SYSTEMS CONTROLLER
5 Claims, 1 Drawing Fig.

[52] U.S. Cl. 179/1, 179/1(.4)
[51] Int. Cl. H09m 9/04
[50] Field of Search 179/1.1, 1 (SW), 1 (AT), 1. (H), 1 (C), 1 (CN), 1 (MN); 317/137; 35/8, 35.3

[56] References Cited

UNITED STATES PATENTS 3,200,516 8/1965 Parker 179/1

*Primary Examiner*—Kathleen H. Claffy
*Assistant Examiner*—Jan S. Black
*Attorney*—Rea C. Helm

ABSTRACT: A central station controller for a multiple system intercommunicating device sets a latching relay to connect a central station microphone to a system determined by a selector. The selector also uses a tripping relay to release the latching relays on all other systems. Provision is made to silence all but one central station loudspeaker and to record and later play back messages which would otherwise be heard on the silenced speaker.

PATENTED APR 6 1971 3,573,375
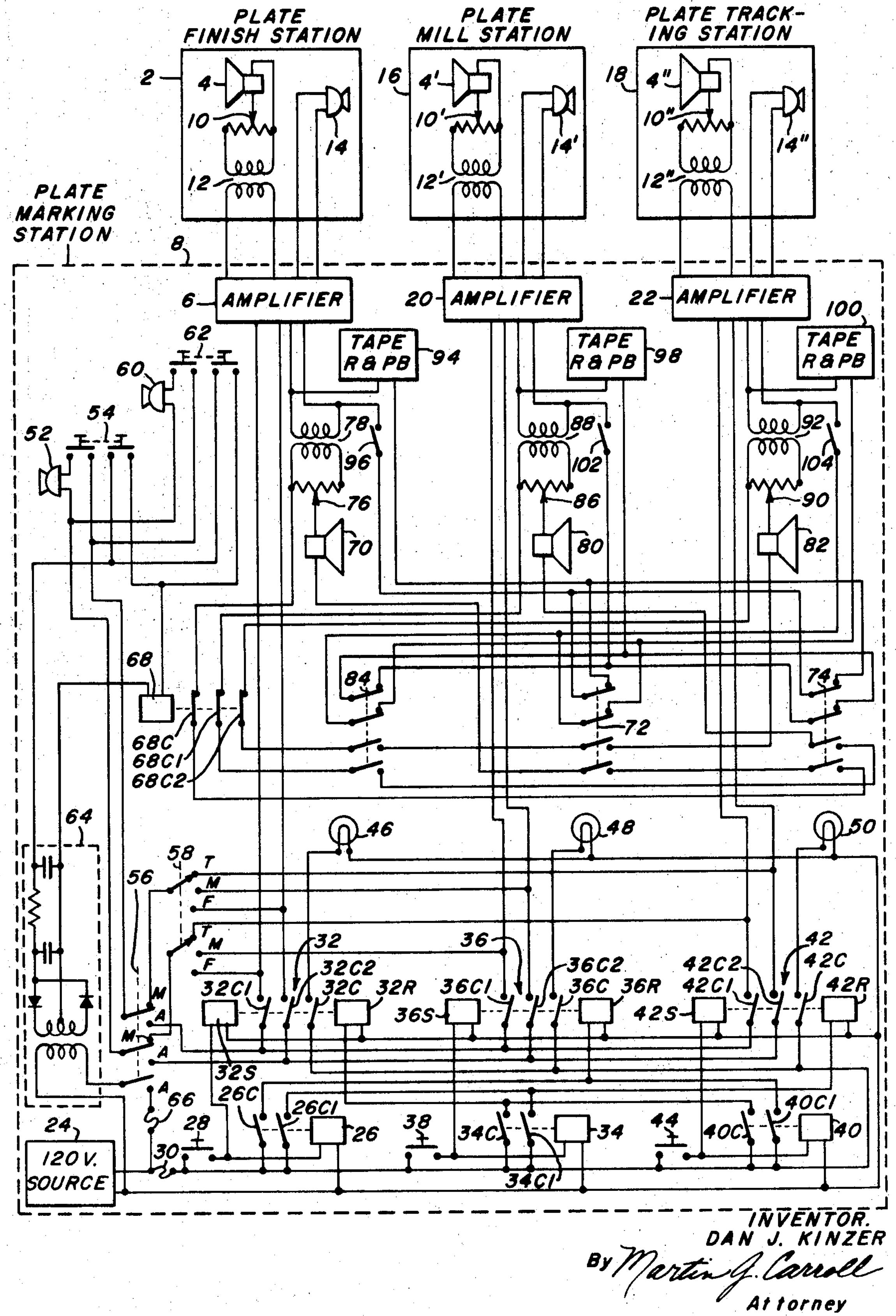
INVENTOR.
DAN J. KINZER
By Martin J. Carroll
Attorney

COMMUNICATIONS SYSTEMS CONTROLLER

This invention relates to circuitry for intercommunicating devices, and more particularly to control circuitry in a common central station of a multiple-system intercommunicating device.

Intercommunicating systems are often used in steel mills, particularly in an elongated installation such as a rolling mill, to provide necessary communications between certain areas associated with a rolling mill. Each system generally has two or more remotely spaced stations with a microphone, a loudspeaker and an amplifier at a central station and a microphone and a loudspeaker at each remote station connected to the central station amplifier. When more than one system terminates at a central station, the operator has difficulty in maintaining communications simultaneously on all systems. The problem is aggravated when the central station is also a control pulpit and the operator has mill control duties to perform. The operator hears the voice traffic on all systems which leads to garbled and unintelligible communications.

According to my invention, a central station operator is provided with means to select a system with which he desires to communicate. Incoming communications on the other systems may then be monitored on full or reduced volume, silenced or recorded for later release.

It is therefore an object of my invention to provide a central station selector for a multiple system communications device for selecting one system for two-way communications and to monitor incoming communications on the other systems.

Another object is to provide for central station silencing of those systems with which no communication is desired.

A still further object is to provide for recording and later release of incoming communications on silenced systems.

These and other objects will be more apparent after referring to the following specification and drawing in which:

The single FIGURE is a schematic wiring diagram of the circuit of my invention.

Referring more particularly to the drawing, reference numeral 2 indicates a remote station of an intercommunicating system which may be a Plate Finish or North Station associated with a steel plate rolling mill (not shown). Remote station 2 has a loudspeaker 4 for receiving communications and is connected to an amplifier 6 in a central station 8 through a potentiometer 10 and an impedance matching transformer 12. Central station 8 may be a Plate Marking Pulpit, the communications center where the control operator is located. A microphone 14 in remote station 2 is also connected to amplifier 6. Remote stations 16 and 18 have the same equipment as remote station 2 with similar parts being indicated by priming the reference numerals in station 16 and by double priming the reference numerals in station 18. The stations 16 and 18 are connected to amplifiers 20 and 22 respectively. Station 16 may be a Plate Mill or a Middle Station and station 18 may be a Plate Tracking or South Station, each associated with the plate rolling mill. The amplifiers and remote stations so far described are conventional.

Central station 8 has a 120 volt AC power source 24. A tripping relay coil 26 is connected to power source 24 through a pushbutton switch 28 and a fuse 30. A set coil 32S of a latching relay 32 is also connected to power source 24 through pushbutton switch 28 and fuse 30. A tripping relay coil 34 and a set coil 36S are connected in parallel to power source 24 through a pushbutton switch 38 and fuse 30. A tripping relay coil 40 and a set relay coil 42S are connected in parallel to power source 24 through a pushbutton switch 44 and fuse 30. Tripping relays 26, 34 and 40 may each be a Potter & Brumfield, Model KRP11A. Latching relays 32, 36 and 42 may each be a Potter & Brumfield Model KB17AY which have contacts closed when a set coil is energized and open when a release coil is energized. A release coil 32R is connected to power source 24 through fuse 30 and normally open contacts 34C and 40C connected in parallel. A release coil 36R is connected to power source 24 through fuse 30 and normally open contacts 26C and 40C1 connected in parallel. A release coil 42R is connected to power source 24 through fuse 30 and normally open contacts 26C1 and 34C1 connected in parallel. Indicating lamps 46, 48 and 50 are connected to power source 24 through fuse 30 and contacts 32C, 36C and 42C respectively.

A microphone 52 is connected to amplifier 6 through a pushbutton microphone switch 54, a manual-automatic switch 56 with and the parallel combination of a manual system selector switch 58 with contacts 32C1 and 32C2. Microphone 52 is similarly connected to amplifiers 20 and 22 with switch 58 parallel with contacts 36C1, 36C2 and 42C1 42C2 respectively. A second microphone 60 has a microphone switch 62 and is connected in parallel with microphone 52. Microphones 52 and 60 may be portable and stationed on opposite sides of central station 8.

Power source 24 is also connected to a 12 volt DC power source 64 through switch 56 and a fuse 66. A speaker relay coil 68 is connected to power source 64 through microphone switches 54 and 62 connected in parallel. Relay 68 may be a Potter & Brumfield Model KRP14DG. A loudspeaker 70 is connected to amplifier 6 through a silencing switch 72, a silencing switch 74, normally closed contacts 68C of relay 68, a potentiometer 76 and an impedance matching transformer 78. Similarly, loudspeakers 80 and 82 are connected respectively to amplifier 20 through switches 74 and 84, contact 68C1, a potentiometer 86, and a transformer 88 and to amplifier 22 through switches 72 and 84, contacts 68C2, a potentiometer 90 and a transformer 92.

A tape recorder and playback 94 is connected to amplifier 6 in parallel with transformer 78 through a switch 96 and switches 72 and 74 in parallel. Similarly, tape recorder and playback 98 and 100 are connected respectively to a switch 102 and switches 74 and 84 in parallel and to amplifier 22 through a switch 104 and switches 72 and 84 in parallel.

To operate the controls, power source 24 is energized. Switch 56 is moved down to the "A", or automatic position. Silencer switchs 72, 74 and 84 are in the down position to disconnect the tape recorders and to permit communications from station 2 to speaker 70, from station 16 to speaker 80 and from station 18 to speaker 82. Speaker volume is set to desired levels by potentiometers 76, 86 and 90. The central station operator then selects the remote station with which he desires communications by pressing pushbutton switch 28 for station 2, switch 38 for station 16, or switch 44 for station 18. Assuming he selects station 2, the momentary closing of switch 28 energizes relay 26 and the set coil 32S of relay 32. Energizing relay 26 closes contacts 26C and 26C1 which energizes release coils 36R and 42R of relays 36 and 42 respectively, opening the contacts of relays 36 and 42. Energizing the set coil 32S of relay 32 closes contacts 32C, 32C1 and 32C2 of relay 32 which energizes indicator lamp 46 and connects switch 56 to amplifier 6. The operator is then ready to use microphone 52 or 60.

By pressing switch 54, microphone 52 is connected to amplifier 6 so that his message will be heard from speaker 4. Closing switch 54 also energizes relay 68 which opens all loudspeaker circuits to prevent feedback or oscillations. If the operator desires to silence speakers 80 and 82 and thus hear messages from station 2 only, he moves switch 84 to the up, or silencing position. This disconnects speakers 80 and 82 and, depending upon the positions of switches 102 and 104, incoming messages may then be recorded on tape recorders 98 and/or 100. Messages may subsequently be played back when desired by the operator.

While the operation is thus far described with remote station 2 selected, the controller functions in a similar manner if remote stations 16 or 18 are selected. My invention has also been described with each system using one remote and one master station but is readily adaptable to systems with multiple remote stations, multiple master stations, or combinations thereof.

If power source 24 fails, the operator may manually operate the selector systems by moving switch 56 up to the "M" or manual position and moving selector switch 58 to the upper or "T" position for station 18, to the middle or "M" position for station 16 and to the lower or "F" position for station 2. The silencing switches 72, 74 and 84 will still be operative.

While one embodiment of my invention has been shown and described, it will be apparent that other adaptations and modifications may be made.

I claim:

1. A multiple system intercommunicating device comprising a central station having a microphone therein, a plurality of remote stations each having a loudspeaker and a microphone therein, a plurality of systems in said central station one associated with each remote station, each system including an amplifier connected to the associated remote station loudspeaker and microphone and a central station loudspeaker connected to the amplifier, a central station controller having means for selectively connecting the central station microphone to the amplifier of one system while disconnecting the microphone from the other systems, and means in said central station and associated with each system for disconnecting the central station loudspeaker of the other systems.

2. A device according to claim 1 in which said means for connecting the central station microphone to the amplifier of one system while disconnecting the microphone from the other systems includes a power source, a latching relay for each system having a set coil, a release coil and contacts connecting said microphone to the amplifier of the associated system, said contacts being closed when the set coil is energized, a tripping relay coil for each system having normally open contacts connecting the power source to the release coils of the other systems, and a selector switch for each system connecting the power source to the set coil and tripping coil of the selected system.

3. A device according to claim 1 in which said means in said central station and associated with each system for disconnecting the central station loudspeakers includes a low voltage power source, a loudspeaker relay coil having a pair of normally closed contacts connected in series with each central station system loudspeaker, a central station microphone switch connecting the loudspeaker relay coil to said low voltage power source when said central station microphone is energized, a volume control means for each system connected in series with its associated central station loudspeaker, and a silencing switch associated with each system for disconnecting the central station loudspeakers of the other systems.

4. A device according to claim 3 in which said means for connecting the central station microphone to the amplifier of one system while disconnecting the microphone from the other system includes a power source, a latching relay for each system having a set coil, a release coil and contacts connecting said microphone to the amplifier of the associated system, said contacts being closed when the set coil is energized, a tripping relay coil for each system having normally open contacts connecting the power source to the release coils of the other systems, and a selector switch for each system connecting the power source to the set coil and tripping coil of the selected system.

5. A device according to claim 4 including a tape recorder and play back for each system, a recorder switch for each system for connecting the recorder and play back to its associated amplifier for recording the messages coming into the central station on that system when that central station system loudspeaker is disconnected, and means for playing back the messages thus recorded over said loudspeaker.